United States Patent
Palm

(10) Patent No.: US 7,703,236 B2
(45) Date of Patent: Apr. 27, 2010

(54) METHOD AND APPARATUS FOR KILLING INSECTS

(76) Inventor: Darrell Allen Palm, 8042 E. Highway 71, La Grange, TX (US) 78945

( * ) Notice: Subject to any disclaimer, the term of this patent is extended or adjusted under 35 U.S.C. 154(b) by 1 day.

(21) Appl. No.: 11/823,403

(22) Filed: Jun. 27, 2007

(65) Prior Publication Data

US 2008/0010897 A1    Jan. 17, 2008

Related U.S. Application Data

(60) Provisional application No. 60/818,082, filed on Jun. 30, 2006.

(51) Int. Cl.
  *A01M 1/20*  (2006.01)
  *A01M 5/00*  (2006.01)
  *A01M 5/04*  (2006.01)
(52) U.S. Cl. .................. 43/138; 43/132.1; 43/131; 43/900; 56/16.8
(58) Field of Classification Search ............... 43/138, 43/132.1, 124, 131, 900; 56/16.8
See application file for complete search history.

(56) References Cited

U.S. PATENT DOCUMENTS

| | | | | |
|---|---|---|---|---|
| 119,060 A | * | 9/1871 | Swain | 248/240.4 |
| 187,012 A | * | 2/1877 | Hutchins | 43/138 |
| 454,117 A | * | 6/1891 | Myers | 43/124 |
| 803,371 A | * | 10/1905 | Tanner | 43/124 |
| 827,174 A | * | 7/1906 | Patterson | 43/132.1 |
| 847,887 A | * | 3/1907 | Bergmann | 43/124 |
| 974,042 A | * | 10/1910 | Dresback et al. | 43/900 |
| 987,433 A | * | 3/1911 | Crawford | 43/900 |
| 1,053,019 A | * | 2/1913 | Erickson | 43/132.1 |
| 1,068,177 A | * | 7/1913 | Sieman | 43/138 |
| 1,109,060 A | * | 9/1914 | Griffin | 43/132.1 |
| 1,133,039 A | * | 3/1915 | Kochevar, Jr. | 43/138 |
| 1,294,615 A | * | 2/1919 | Carlson | 43/138 |
| 1,305,965 A | * | 6/1919 | Doty | 43/900 |
| 1,312,969 A | * | 8/1919 | Fox | 43/900 |
| 1,325,475 A | * | 12/1919 | Kemp | 43/138 |
| 1,331,946 A | * | 2/1920 | Stevenson | 43/138 |
| 1,368,123 A | * | 2/1921 | Donaldson | 43/900 |
| 1,470,945 A | * | 10/1923 | Stevens | 43/138 |
| 1,518,305 A | * | 12/1924 | Carmans | 43/138 |
| 1,521,767 A | * | 1/1925 | Hawkins | 43/138 |
| 1,527,669 A | * | 2/1925 | Camp | 47/1.5 |
| 1,530,681 A | * | 3/1925 | Long | 43/138 |
| 1,533,276 A | * | 4/1925 | Sanchez | 43/138 |

(Continued)

*Primary Examiner*—Darren W Ark
(74) *Attorney, Agent, or Firm*—Stephen S. Hodgson

(57) ABSTRACT

An apparatus and a method are provided for killing insects on vegetation using an insecticide, where the insecticide does not contact the vegetation. In one embodiment, an absorbent material is placed on an upper surface of a disc mower. The absorbent material is soaked with insecticide, and as a tractor moves the mower through a field of hay, insects land on the insecticide-laden material and die from the toxic effect of the insecticide. In another embodiment, an L-shaped blade outfitted with an insecticide-laden mat is mounted transverse to the front of an all-terrain vehicle or a tractor, which is driven through a field. The blade, or alternatively a feeder bar attached to the blade, brushes the tips of vegetation in the field, causing bugs and insects to fly, fall or jump from the vegetation onto the insecticide-laden mat, where the insecticide kills some, most or all of the bugs and insects.

2 Claims, 3 Drawing Sheets

U.S. PATENT DOCUMENTS

| | | | | |
|---|---|---|---|---|
| 1,563,668 | A | * | 12/1925 | Smith et al. ............... 43/138 |
| 1,568,448 | A | * | 1/1926 | Freeman .................. 43/124 |
| 1,624,240 | A | * | 4/1927 | Harwood et al. ........... 43/138 |
| 1,643,846 | A | * | 9/1927 | Hale ........................ 47/1.5 |
| 1,732,849 | A | * | 10/1929 | Letzerich ................ 43/132.1 |
| 1,764,952 | A | * | 6/1930 | Hay ......................... 43/900 |
| 1,818,369 | A | * | 8/1931 | Watson et al. ............ 43/132.1 |
| 1,992,648 | A | * | 2/1935 | Browne .................... 43/131 |
| 2,029,225 | A | * | 1/1936 | Ekre ........................ 43/138 |
| 2,111,030 | A | * | 3/1938 | Mote ....................... 56/16.8 |
| 2,149,503 | A | * | 3/1939 | Bowlin ..................... 43/138 |
| 2,153,907 | A | * | 4/1939 | Allen ....................... 43/138 |
| 2,167,923 | A | * | 8/1939 | Leffler et al. ............. 43/138 |
| 2,242,710 | A | * | 5/1941 | Loomis .................... 56/249 |
| 2,256,125 | A | * | 9/1941 | Noffsinger et al. ........ 43/138 |
| 2,526,781 | A | * | 10/1950 | Strauss ..................... 43/138 |
| 2,551,096 | A | * | 5/1951 | Chittick ................... 56/295 |
| 2,573,784 | A | * | 11/1951 | Asbury .................... 56/16.8 |
| 2,605,587 | A | * | 8/1952 | Wester et al. ............. 56/249 |
| 2,721,437 | A | * | 10/1955 | Greenlund ................ 56/249 |
| 2,740,248 | A | * | 4/1956 | Pickens ................... 56/16.8 |
| 2,754,624 | A | * | 7/1956 | Wester ..................... 56/249 |
| 2,849,851 | A | * | 9/1958 | Hayter ..................... 56/157 |
| 2,865,671 | A | * | 12/1958 | Jensen ..................... 43/129 |
| 2,908,444 | A | * | 10/1959 | Mullin ..................... 56/16.8 |
| 2,939,636 | A | * | 6/1960 | Mullin ..................... 56/16.8 |
| 2,973,615 | A | * | 3/1961 | Yaremchuk et al. ........ 56/16.8 |
| 2,986,841 | A | * | 6/1961 | MacDonald ........ 56/DIG. 1 |
| 3,002,319 | A | * | 10/1961 | Laughlin .................. 47/1.5 |
| 3,021,642 | A | * | 2/1962 | Ewing ...................... 56/229 |
| 3,097,467 | A | * | 7/1963 | Konrad .................... 56/16.8 |
| 3,118,427 | A | * | 1/1964 | Stanzel .................... 43/131 |
| 3,129,852 | A | * | 4/1964 | Mower ..................... 56/229 |
| 3,140,574 | A | * | 7/1964 | Brown, Jr. ................. 56/229 |
| 3,151,563 | A | * | 10/1964 | Lita et al. ................. 56/16.8 |
| 3,162,972 | A | * | 12/1964 | McCurley ................. 43/129 |
| 3,247,655 | A | * | 4/1966 | Jacob ...................... 56/255 |
| 3,257,753 | A | * | 6/1966 | Zennie ..................... 47/1.5 |
| 3,332,221 | A | * | 7/1967 | McCain .................... 56/295 |
| 3,334,475 | A | * | 8/1967 | Danisch ................... 56/16.8 |
| 3,405,514 | A | * | 10/1968 | Pulrang .................... 56/16.8 |
| 3,534,533 | A | * | 10/1970 | Luoma ..................... 56/16.8 |
| 3,584,446 | A | * | 6/1971 | Bernshausen ............. 56/328.1 |
| 3,785,564 | A | * | 1/1974 | Baldocchi ................. 47/1.7 |
| 3,846,932 | A | * | 11/1974 | Bialobrzeski ............. 43/138 |
| 3,857,515 | A | * | 12/1974 | Zennie ..................... 56/16.8 |
| 3,982,697 | A | * | 9/1976 | Maples .................... 56/16.8 |
| 4,015,366 | A | * | 4/1977 | Hall, III ................... 56/237 |
| 4,047,326 | A | * | 9/1977 | Tibbs ....................... 47/1.3 |
| 4,078,626 | A | * | 3/1978 | Weichel ................... 56/13.5 |
| 4,148,150 | A | * | 4/1979 | Harrell .................... 43/144 |
| 4,187,638 | A | * | 2/1980 | Hardy et al. .............. 47/1.5 |
| 4,212,148 | A | * | 7/1980 | Brownlee ................. 56/328.1 |
| 4,219,964 | A | * | 9/1980 | Dale ........................ 47/1.5 |
| 4,242,855 | A | * | 1/1981 | Beaver, Jr. ................ 56/16.8 |
| 4,285,160 | A | * | 8/1981 | Barton et al. ............. 47/1.5 |
| D262,179 | S | * | 12/1981 | Hardy et al. .............. D8/2 |
| D262,180 | S | * | 12/1981 | Hardy et al. .............. D8/2 |
| 4,327,541 | A | * | 5/1982 | Emory ..................... 56/16.8 |
| 4,369,596 | A | * | 1/1983 | Hartford ................... 56/16.8 |
| 4,379,385 | A | * | 4/1983 | Reinhall ................... 56/16.6 |
| 4,426,807 | A | * | 1/1984 | Maddock .................. 47/1.5 |
| 4,443,970 | A | * | 4/1984 | Randolph .................. 47/1.5 |
| 4,459,777 | A | * | 7/1984 | Moore et al. .............. 47/1.5 |
| RE32,067 | E | * | 1/1986 | Emory ..................... 56/16.8 |
| 4,662,163 | A | * | 5/1987 | Adams ..................... 56/16.8 |
| 4,821,959 | A | * | 4/1989 | Browing ................... 56/16.8 |
| 4,887,384 | A | * | 12/1989 | Reyne ...................... 47/1.5 |
| 4,977,701 | A | * | 12/1990 | Sherman ................... 43/122 |
| 5,195,308 | A | * | 3/1993 | Grote et al. ............... 56/16.8 |
| 5,237,803 | A | * | 8/1993 | Domingue, Jr. ............ 56/16.8 |
| 5,493,852 | A | * | 2/1996 | Stewart .................... 56/16.8 |
| 5,533,676 | A | * | 7/1996 | Conley .................... 56/16.8 |
| 5,657,620 | A | * | 8/1997 | Thagard et al. ........... 56/15.2 |
| 5,735,049 | A | * | 4/1998 | Ishikawa .................. 56/12.7 |
| 5,765,348 | A | * | 6/1998 | Thagard et al. ........... 56/15.2 |
| 5,768,822 | A | * | 6/1998 | Harrell .................... 43/144 |
| 5,813,122 | A | * | 9/1998 | Mubareka ................. 56/16.8 |
| 5,992,134 | A | * | 11/1999 | Blide et al. ............... 56/16.8 |
| 6,003,387 | A | * | 12/1999 | Larson et al. ............. 56/DIG. 2 |
| 6,101,798 | A | * | 8/2000 | Thagard et al. ........... 56/16.8 |
| 6,125,621 | A | * | 10/2000 | Burch ...................... 56/16.8 |
| 6,145,288 | A | * | 11/2000 | Tamian et al. ............. 56/16.8 |
| 6,164,049 | A | * | 12/2000 | Burch ...................... 56/16.8 |
| 6,272,819 | B1 | * | 8/2001 | Wendte et al. ............. 56/11.9 |
| 6,374,586 | B1 | * | 4/2002 | Burch ...................... 56/16.8 |
| 6,446,420 | B1 | * | 9/2002 | Worsham et al. .......... 56/16.8 |
| 6,497,088 | B1 | * | 12/2002 | Holley ..................... 56/16.8 |
| 6,553,299 | B1 | * | 4/2003 | Keller et al. .............. 56/10.2 A |
| 6,718,690 | B2 | * | 4/2004 | Podgurney et al. ......... 43/138 |
| 6,807,799 | B2 | * | 10/2004 | Reaux ...................... 56/14.3 |
| 6,860,093 | B2 | * | 3/2005 | Scordilis .................. 56/15.2 |
| 7,043,890 | B2 | * | 5/2006 | Lofton ..................... 56/16.8 |
| 7,249,448 | B2 | * | 7/2007 | Murphy et al. ............ 56/15.8 |
| 7,490,434 | B2 | * | 2/2009 | Ariaz et al. ............... 43/132.1 |
| 2002/0124541 | A1 | * | 9/2002 | Oepping et al. ........... 56/16.4 R |
| 2007/0084174 | A1 | * | 4/2007 | Weiland ................... 56/16.8 |
| 2008/0105445 | A1 | * | 5/2008 | Dayton et al. ............. 56/253 |
| 2008/0109126 | A1 | * | 5/2008 | Sandin et al. ............. 56/229 |
| 2009/0199531 | A1 | * | 8/2009 | Labar et al. ............... 56/16.8 |

* cited by examiner

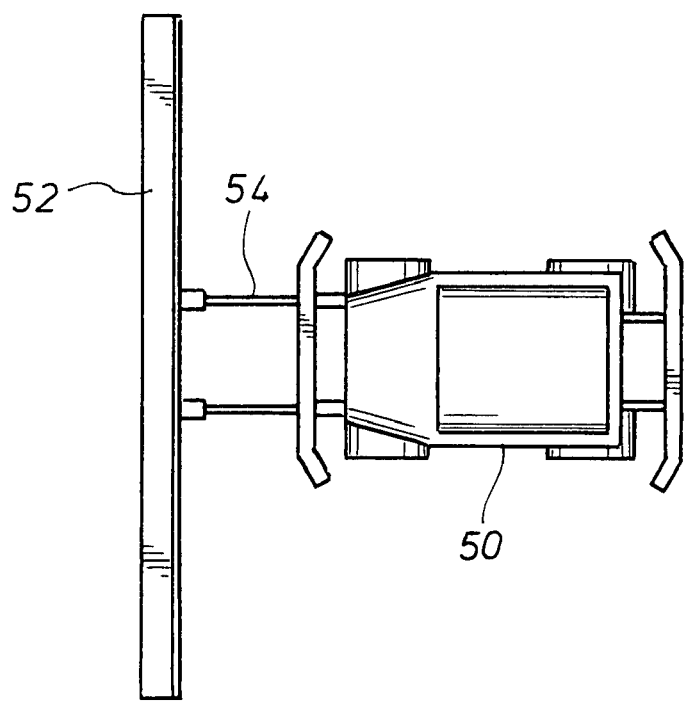
FIG. 5
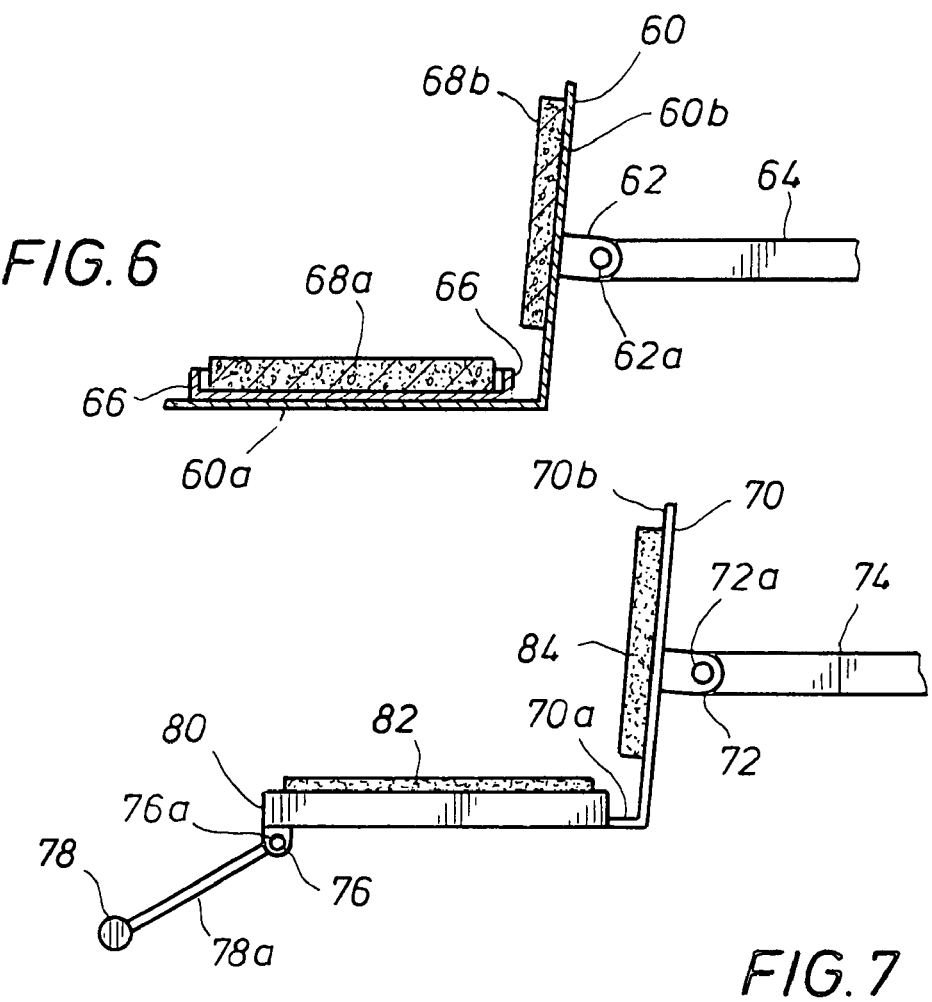
FIG. 6
FIG. 7

METHOD AND APPARATUS FOR KILLING INSECTS

CROSS REFERENCE TO RELATED APPLICATION

Priority is claimed to U.S. Provisional Patent Application Ser. No. 60/818,082 filed by the inventor on Jun. 30, 2006, which is incorporated by reference.

BACKGROUND OF THE INVENTION

1. Field of the Invention

This invention pertains to killing insects, particularly to a method and apparatus for exposing insects to an insecticide.

2. Description of the Related Art

Insects damage crops and vegetation. Grasshoppers and other insects continue to cause damage to numerous agricultural, residential and recreational properties. For example, farmers plant seeds and grow hay for food for cows, and insects, such as grasshoppers, eat the hay before it is harvested. Insecticides have been spayed or otherwise applied to crops and vegetation, but this is not always desirable due to cost or other considerations, such as environmental concerns.

U.S. Pat. Nos. 4,148,150 and 5,768,822, issued to Harrell and incorporated by reference, describe tractor-mounted apparatus for collecting and destroying insects from multiple rows of plants as a tractor passes along the rows. The apparatus has metal pans that collect insects and gas-fired burners for heating the pans and incinerating the insects.

U.S. Pat. No. 6,718,690, issued to Podgurney et al. and incorporated by reference, describes a bug zapper that is pulled behind a tractor for catching and electrocuting bugs. First and second grids, which are spaced apart by a small gap, extend laterally in relation to a direction of travel. Insects are caught on the grids and pass through the gap and are electrocuted as they bridge the gap.

U.S. Pat. No. 4,977,701, issued to Sherman and incorporated by reference, describes a tamper resistant flying insect control device, which attracts flying insects, such as houseflies, into an enclosed area that has been coated with a toxin capable of killing insects. Sherman states that a housefly produces a pheromone that attracts other houseflies and that the pheromone continues to be active after the housefly dies, thus attracting more houseflies into the device.

SUMMARY OF THE INVENTION

The present invention provides an apparatus and method for killing insects. In one embodiment, the apparatus includes an absorbent or rechargeable surface adapted for holding an insecticide. The apparatus can be attached to a movable piece of equipment, such as a tractor or a lawnmower, and the apparatus collects insects as the piece of equipment moves along. An insecticide is applied to the absorbent or rechargeable surface, and insects come into contact with the insecticide and die. In this manner insects can be killed without applying insecticide to vegetation or soil.

The apparatus and method of the present invention reduces insecticide use and eliminates application of insecticide to soil and plants. Insecticide is contained on a surface on a piece of equipment, which is moved through an area infested with insects. The insects come into contact with the insecticide by landing on the insecticide-laden surface, either by jumping onto the surface, flying and landing on the surface or by falling onto the surface.

In a preferred embodiment, an absorbent mat is fixed to a surface on a hay mower, which is attached to a tractor for mowing hay in a field. Insecticide is applied to the mat. As hay is mowed, grasshoppers fall or jump off the hay onto the mat, where they are exposed to the insecticide, which causes the grasshoppers to die. The insecticide can be applied to the mat manually or through an automated pumping system with a tank or reservoir. A bar can be placed in front of the mat to facilitate knocking insects off tall blades or stalks of plants onto the mat in a preferred embodiment.

BRIEF DESCRIPTION OF THE DRAWINGS

A better understanding of the invention can be obtained when the detailed description of exemplary embodiments set forth below is considered in conjunction with the attached drawings, which are described as follows.

FIG. 5 is a top view of an all-terrain vehicle and an apparatus according to the present invention attached to the vehicle.

FIG. 6 is a side view of a blade adapted for holding and exposing insecticide according to the present invention.

FIG. 7 is a side view of a blade adapted for holding and exposing insecticide and a bar for facilitating movement of insects from plants onto an insecticide-laden mat according to the present invention.

DETAILED DESCRIPTION OF THE INVENTION

The present invention provides a method and apparatus for killing insects. The invention concerns containing and exposing an insecticide on a piece of equipment, moving the equipment over or through vegetation, where insects that are desired to be killed are on the vegetation, and exposing the insects to the insecticide. The apparatus comprises preferably a fibrous material adapted for absorbing an insecticide, and the fibrous material is adapted for attachment to a piece of equipment. The fibrous material is adapted for receiving connectors for attaching the fibrous material to the piece of equipment, such as by wire ties through holes in the fibrous material or by straps, which may wrap around a portion of the equipment and onto itself where it is held by a Velcro® hook and loop fastener or other mechanical connection. The figures provide example embodiments of the present invention.

Figure 1:
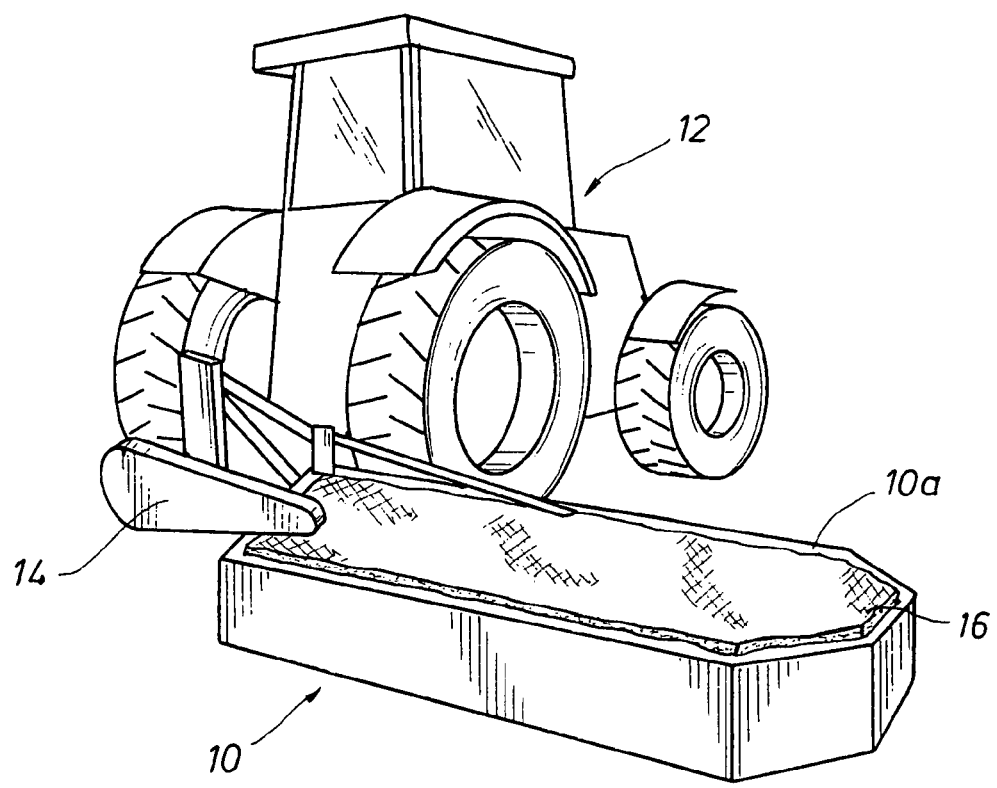
FIG. 1 is a rear perspective view of a disc mower attached to a tractor with a fibrous material attached to the mower for holding and exposing insecticide according to the present invention.

With reference to the figures, FIG. 1 is a perspective view of a disc mower 10 attached to a tractor 12 as seen from the back. Disc mower 10 has a top surface 10a and is connected to tractor 12 through drive and connection means 14. A layer of material 16 is fastened to top surface 10a for holding or containing insecticide or pesticide. The layer of material 16 is soaked, saturated, filled or coated with insecticide or pesticide. Tractor 12 and mower 10 are used to mow or cut hay, grass or another vegetation. Insects are on and in the hay, grass or other vegetation. With the layer of material 16 soaked, saturated, filled or coated with insecticide or pesticide, as mower 10 passes over and through the hay, grass or other vegetation, insects fly, fall or jump onto the insecticide-laden layer of material 16, exposing the insects to the insecticide. Many, if not most, of the insects thus exposed to the insecticide die essentially immediately or a short time after the exposure to the insecticide.

Figure 2:
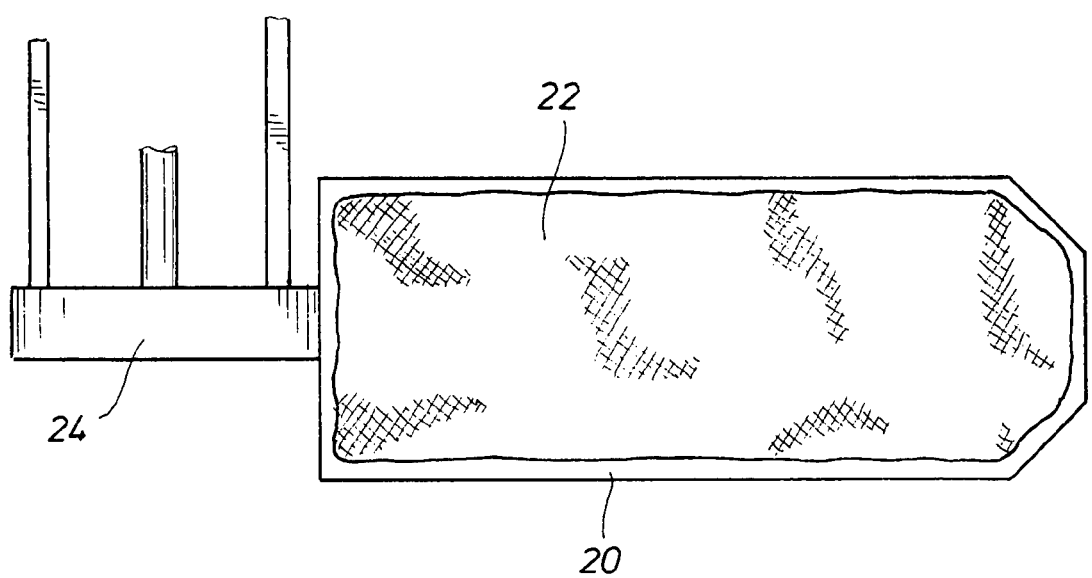
FIG. 2 is a top view of a disc mower with a mat for holding and exposing insecticide according to the present invention.

FIG. 2 is a top view of a disc mower 20. A mat 22 for holding insecticide according to the present invention is attached to mower 20 by connectors. Connectors for mat 22 are a double-sided tape (not shown) for securing mat 22 adhesively to mower 20, but other connectors such as wire ties, C-clamps, screws and bolts and nuts can be used. A drive and connection means 24 is adapted for fastening mower 20 to a tractor (not shown in FIG. 2). Mat 22 is a fibrous material that absorbs and holds insecticide, which is preferably liquid but may be powder or granular. Examples of fibrous material include, but are not limited to, sponge, fabric, cotton, wool, synthetic fibers, synthetic woven material, foamed materials such as foamed rubber or polyurethane and brush bristles.

Figure 3:
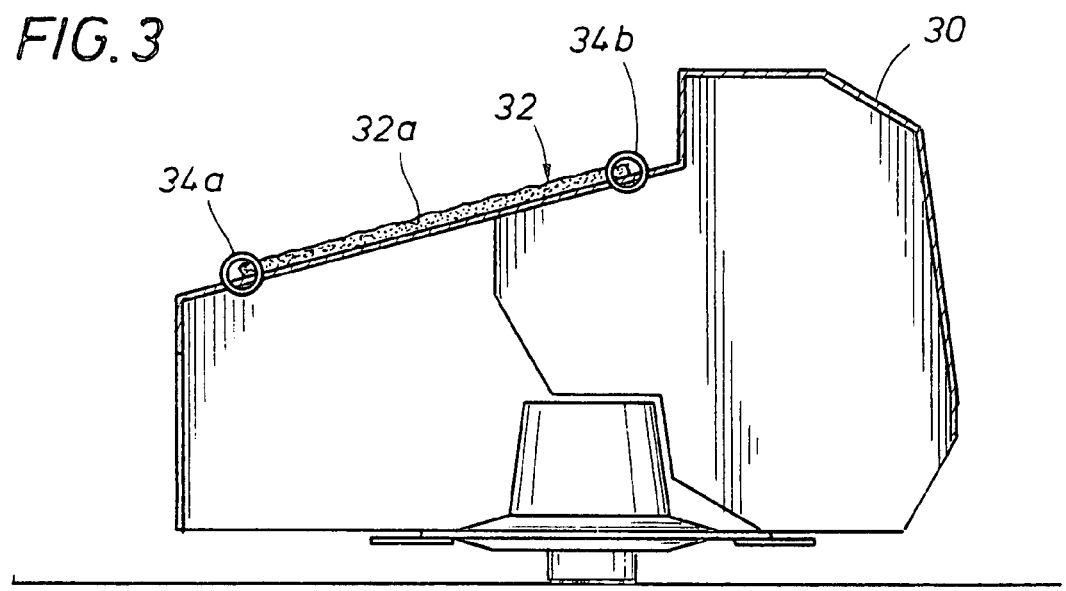
FIG. 3 is a cross-sectional view of a disc mower and mat for holding and exposing insecticide according to the present invention.
Figure 4:
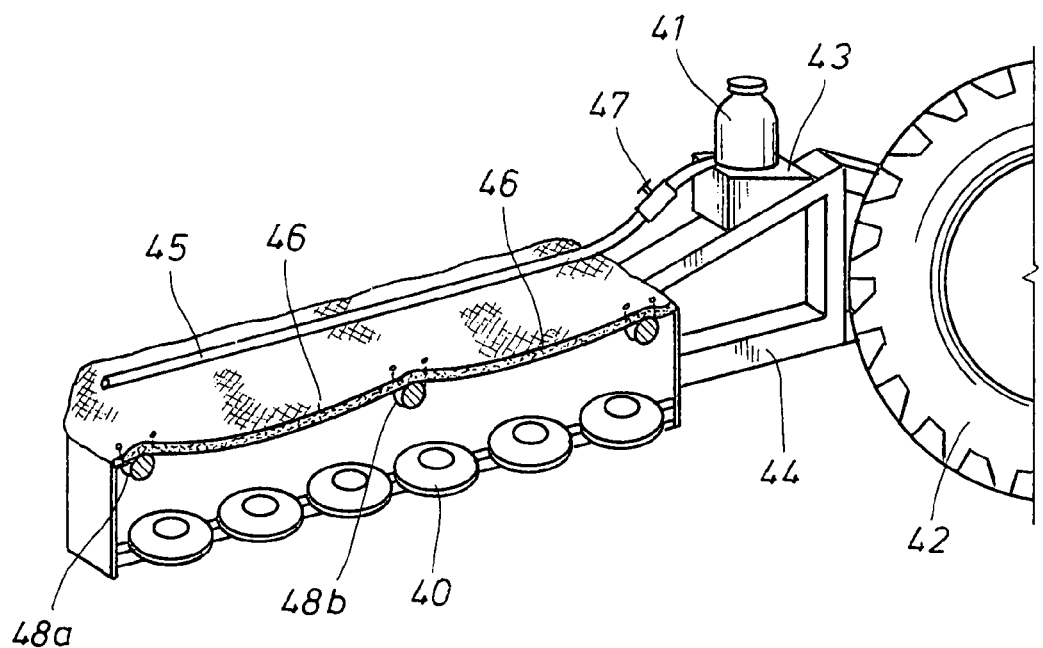
FIG. 4 is a perspective view of a disc mower and mat for holding and exposing insecticide according to the present invention as seen from the front.

FIG. 3 is a cross-sectional side view of a disc mower 30 and a mat 32 for holding insecticide according to the present invention. Brackets 34a and 34b fasten mat 32 to mower 30. In this embodiment, a liquid insecticide is applied by hand by pouring or spraying onto a top surface 32a of mat 32. Alternatively, an automated system, such as described below, can be used for applying insecticide to mat 32.

Turning to FIG. 4, a front perspective view of a mower 40 is shown attached to a tractor 42 (where only a portion of a tire is shown) by drive and connection means 44. A mat 46 is attached to mower 40 via U-bolts 48*a* and 48*b*. Application of insecticide on mat 46 is automated in this embodiment. A tank 41 containing insecticide is attached to drive and connection means 44 via a bracket 43. A hose 45 feeds insecticide from tank 41 to mat 46 through a valve 47. Hose 45 can be a soaker hose, which is porous, or hose 45 can have outlet nozzles, which are not shown, for distributing insecticide onto mat 46. With tank 41 higher than hose 45 and its outlet nozzles, gravity will provide a force for moving the insecticide from tank 41 to mat 46. Multiple spray heads (not shown) may be used to evenly distribute insecticide onto mat 46, in which case it may be necessary to maintain higher-than-atmospheric pressure on tank 41.

FIG. 5 is a top view of an all-terrain vehicle 50. A blade 52 is attached to a frame 54, which is in turn attached to vehicle 50. Blade 52 is adapted to hold insecticide for exposing insects to the insecticide. Vehicle 50 is driven over, around or through vegetation that has insects. The insects come into contact with the insecticide on blade 52 and die as a consequence of the exposure to the insecticide. Typically, blade 52 brushes the vegetation as vehicle 50 is driven over, around or through vegetation, and insects on the vegetation jump, fly or fall onto blade 52.

FIG. 6 shows a cross-sectional side view of one embodiment of a blade according to the present invention, which is a blade 60 having an L-shaped cross-section. Blade 60 has a bracket 62 attached to a frame 64, which can be adapted to mount on a vehicle such as a tractor or an all-terrain vehicle (not shown). Bracket 62 includes a bolt 62*a* adapted to allow adjustment of the angle of blade 60. Blade 60 comprises a horizontal blade portion 60*a* and a vertical blade portion 60*b*. A pan 66 is attached to horizontal blade portion 60*a* and is adapted to hold liquid, powder or granular insecticide or pesticide as a reservoir. Preferably, a liquid insecticide is used, and a fibrous mat 68*a* is fastened inside pan 66 by any of several suitable means such as by brackets (not shown) over mat 68*a* that are fastened to pan 66. In one embodiment, a mat 68*b* is secured to vertical blade portion 60*b*. Insecticide can be placed on mat 68*b* and on mat 68*a* as well as inside pan 66. Mat 68*a* stays moist while liquid insecticide is in pan 66 due to wicking or capillary action.

FIG. 7 is a side view of an L-shaped blade 70 having a bracket 72 for mounting to a frame 74 and providing angle adjustment through a connector 72*a*. Blade 70 also has a bracket 76. A feeder bar 78 and a feeder plate 78*a* are attached to blade 70 by connection to bracket 74 using a bolt, pin or rivet 76*a*. The connection of feeder bar 78 to bracket 76 can be rotated at bolt, pin or rivet 76*a* to adjust the angle of feeder plate 78*a*. If necessary, a support arm (not shown) can be connected to feeder bar 78 and the underside of blade 70 to stiffen the connection of feeder bar 78 to blade 70. Blade 70 has an inside horizontal surface 70*a* and an inside vertical surface 70*b*. A shallow reservoir 80 is mounted to inside horizontal surface 70*a* for holding a quantity of insecticide. An absorbent material 82 is positioned inside of reservoir 80 for exposing the insecticide to insects that land on absorbent material 82. An absorbent pad 84 is mounted, such as by an adhesive, to inside vertical surface 70*b*. Insecticide can be applied to absorbent pad 84 manually or through an automated system similar to the one described above with reference to FIG. 4.

In an alternative embodiment of the present invention, blade 70 of FIG. 7 is used without reservoir 80, absorbent material 82 or absorbent pad 84. In this alternative embodiment (not shown), a tacky or sticky material is applied directly to inside horizontal surface 70*a* and inside vertical surface 70*b* of blade 70, and insects and other bugs stick to the tacky material, which may or may not also be toxic to insects and other bugs. A sticky or tacky material that is non-toxic can be used instead of the toxic insecticide described for use in the embodiments of the invention described above. Further, a sticky or tacky material that is also toxic to insects and bugs can be used in the embodiments of the invention described above where appropriate, in which case insects and bugs that become stuck at least temporarily to the sticky or tacky material have a prolonged exposure to a toxic insecticide, improving the killing effectiveness of the insecticide. An alternative to the sticky or tacky material is a fabric with a multitude of hooks or loops, such as used in a VELCRO® hook and loop fastening system. Bugs and insects can become at least temporarily stuck to a fabric with a multitude of hooks or loops, which can be soaked with insecticide.

Blade 70 with bar 76 can be mounted via frame 74 onto a vehicle, which can be driven through a field or orchard for killing insects and bugs. The field may contain vegetation such as hay, wheat, lettuce, corn or cotton. For an orchard, the shape of the blade may be modified to better conform to the shape of trees in the orchard. Feeder bar 76 is adapted and adjusted, along with the elevation or height of blade 70, to brush the tips or somewhat below the tips of the vegetation to get bugs and insects, such as grasshoppers, weevils and caterpillars, to fall, fly or jump onto the insecticide on blade 70 or on a mat, such as mat 68*a* in FIG. 6, where exposure to the insecticide or pesticide kills the bug or insect.

A mat or layer of fibrous material used to hold and expose insecticide should be sized appropriately for the particular piece of equipment on which it is mounted. After soaking the mat with liquid insecticide, the piece of equipment is moved through a field of hay, over a crop, over turf or lawn or through an orchard. Insects are stirred up and jump, fly or fall onto the mat, where they are exposed to the insecticide, which causes the insects to die. A pan can be used to contain the mat and provide a reservoir from which the insecticide can wick into the mat through capillary action, in which case the pan is connected to the piece of equipment, and the mat lies inside the pan or may be fastened inside the pan. An automated system can be used to replenish the mat with insecticide. In this manner the number of insects on or in vegetation can be reduced, which reduces damage to the vegetation caused by the insects.

Having described the invention above, various modifications of the techniques, procedures, materials, and equipment will be apparent to those skilled in the art. It is intended that all such variations within the scope and spirit of the invention be included within the scope of the appended claims or within the scope of claims subsequently made to the invention.

I claim:

1. A method for killing insects, comprising:
   a) adapting a mower for use in killing insects, wherein the mower has a frame and one or more blades mounted in or to the frame, the frame having a top surface, wherein the one or more blades move with respect to the frame for providing a cutting action when the mower is in operation, comprising the steps of:
      i) attaching a layer of absorbent material to the top surface of the frame of the mower such that the layer of absorbent material is positioned above the one or more blades; and
      ii) soaking, saturating, filling or coating the layer of absorbent material with an insecticide such that the insecticide is exposed to ambient air on the layer of absorbent material;
   b) mowing or cutting hay, grass or other vegetation with the mower; and
   c) exposing insects to the insecticide due to the insects flying, falling or jumping onto the layer of absorbent material.

2. The method of claim 1, wherein the insecticide does not contact the hay, grass or other vegetation for the purpose of killing the insects.

* * * * *